(No Model.)  3 Sheets—Sheet 1.
E. BOEHME.
HYDRAULIC SHEARS.
No. 345,359.  Patented July 13, 1886.
Fig. I.
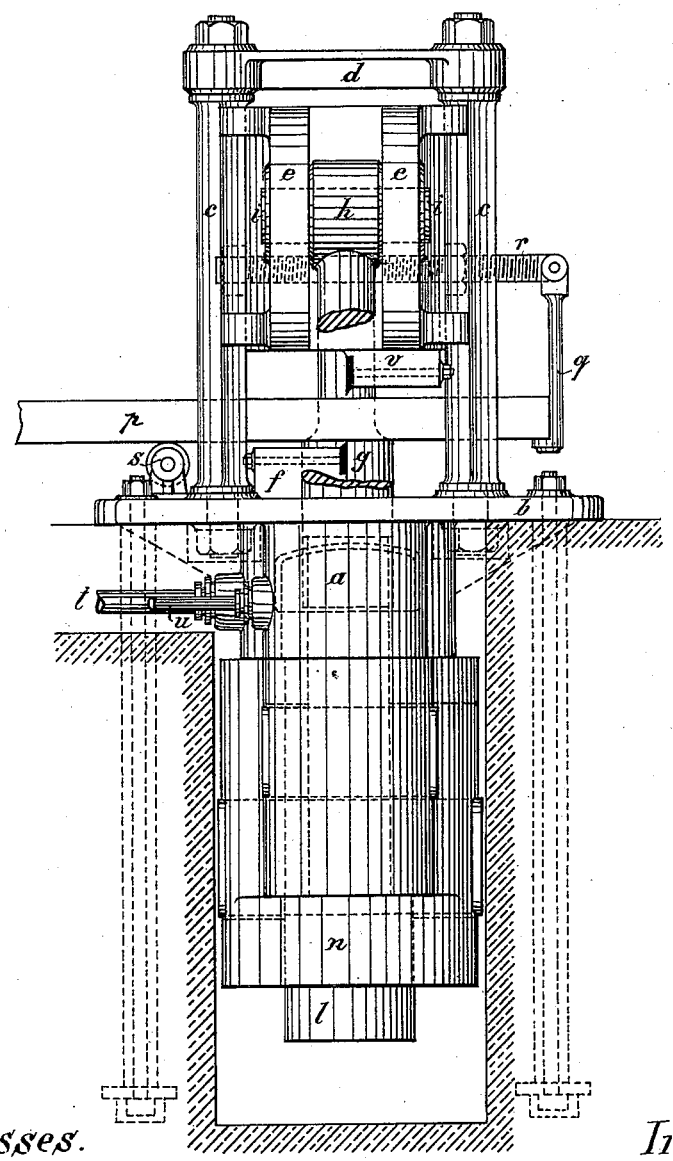
Witnesses.  Inventor.
T. Turner  Emil Boehme
Wm. A. Lowe  per Roeder & Briesen
  Attorneys.

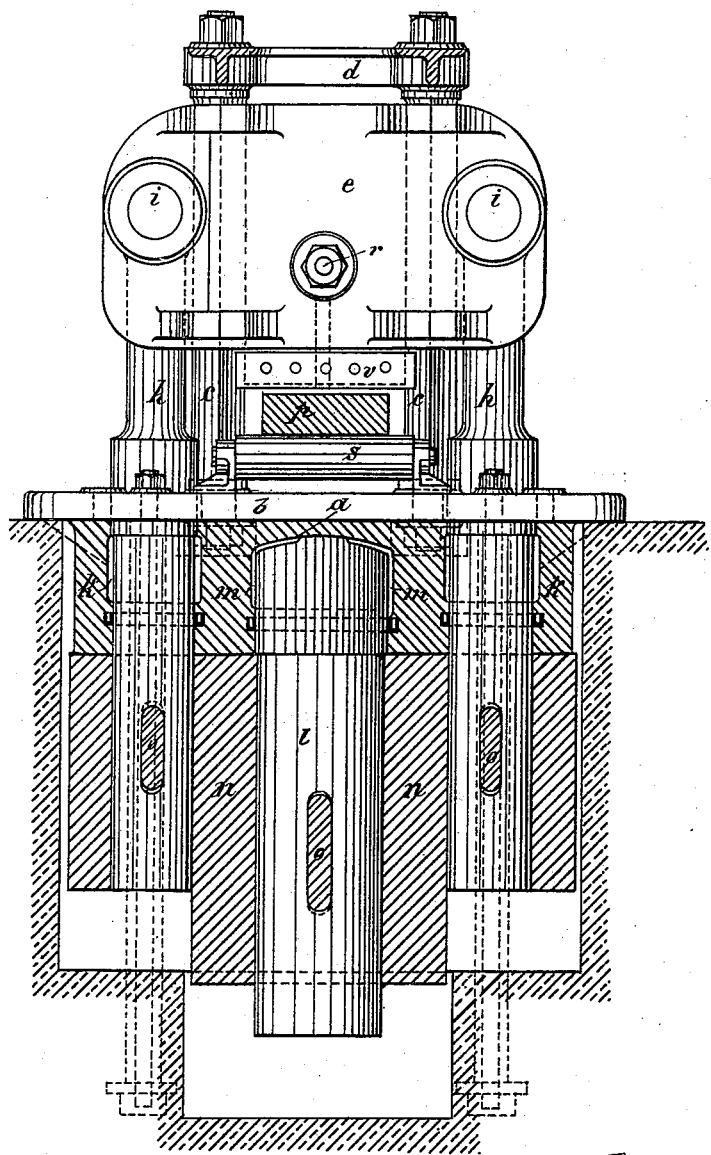

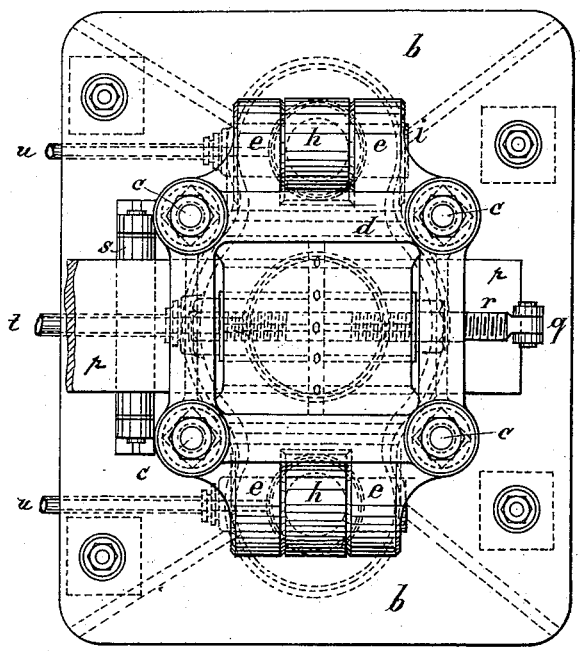
Fig. III.

UNITED STATES PATENT OFFICE.

EMIL BOEHME, OF BRESLAU, PRUSSIA, GERMANY.

HYDRAULIC SHEARS.

SPECIFICATION forming part of Letters Patent No. 345,359, dated July 13, 1886.

Application filed April 8, 1886. Serial No. 198,306. (No model.)

*To all whom it may concern:*

Be it known that I, EMIL BOEHME, a subject of the King of Prussia, residing at Breslau, in the Kingdom of Prussia, Germany, have invented new and useful Improvements in Hydraulic Shears for Cutting Thick Steel and Iron Blocks, of which the following is a specification.

This invention relates to a machine whereby steel and iron blocks of five hundred millimeters width and one hundred and sixty millimeters thickness may be cut.

The invention consists in the elements of improvement hereinafter more fully pointed out.

In the accompanying drawings, Figure I is a side view of the machine; Fig. II, a front view, and Fig. III a plan, of the same.

The machine consists of a triplicate cylinder, $a$, made of steel castings, with which the bed-plate $b$ and the block $f$ are cast in one piece. Four pillars, $c\ c\ c\ c$, firmly secured on the bed-plate, are on their top strongly connected together by a cross-bar, $d$. The head $e$ of the shears is guided in its up-and-down motion by the four pillars $c\ c\ c\ c$. The head $e$ carries the upper blade, $v$, and the two bolts $i\ i$, to which are connected, by means of eyes, the drawing-rods $h\ h$. These rods are constructed in the same manner as differential pistons, and move up and down in the cylindrical borings $k\ k$. The principal piston, $l$, moving up and down in the cylindrical boring $m$, and the two pistons $h\ h$ are all together fastened by means of wedges $o\ o\ o$ in the cross-head $n$.

When water, being under a strong pressure, is conducted through the pipe $t$ into the main cylinder $m$, the cross-head $n$, the two drawing-rods $h\ h$ and the head $e$ are moved downward by the principal piston, $l$, the two blades approach one another and cut the work $p$, placed between them. To prevent that the piece to be cut off tips downward, whereby an oblique cutting-surface would be produced, the work is placed upon a supporting-hook, $q$, which, by means of the screw $r$, can be moved backward or forward, according to the length of the piece to be cut off. In order to move the work more easily it is supported on the front side of the shears by a roll, $s$. When the cutting operation is finished, the water is conducted by means of a valve through the pipes $u\ u$ into the two cylinders $k\ k$, so that by the differential pistons $h\ h$ the head $e$ is moved upward and the cutting operation can be recommenced.

The up-and-down motion of the blades can be regulated by means of the valve exactly according to the thickness of the pieces to be cut off, so that a useless motion of the head $e$ is entirely avoided.

I claim as my invention—

1. The combination, in hydraulic shears, of head $e$ with piston $l$, cross-head $n$, and drawing-rods $h\ h$, all being so constructed that the water-pressure is transmitted to head $e$ by piston $l$ by means of cross-head $n$, and of two rods, $h\ h$, used at the same time as hydraulic-pressure pistons, substantially as specified.

2. The combination of head $e$, carrying shear-blade $v$, and guided on rods $c\ c$, with rods $h\ h$, and with cross-head $n$ and piston $l$, substantially as specified.

3. The combination of the triplicate hydraulic cylinder $a$ with the base-plate $b$, block $f$, carrying lower blade, $g$, and with the cross-head $e$, upper blade, $v$, pistons $l\ h\ h$, and cross-head $n$, substantially as specified.

4. The combination of cross-head $n$ with the main piston $l$, fixed therein, and with the two differential pistons $h\ h$, serving at the same time as drawing-rods, substantially as specified.

In testimony whereof I have signed my name to this specification in the presence of two subscribing witnesses.

EMIL BOEHME.

Witnesses:
PAUL KRAUSE,
EDUARD KLEINERT.